United States Patent
Chen

(10) Patent No.: US 11,208,536 B2
(45) Date of Patent: Dec. 28, 2021

(54) BLOWING AGENT COMPOSITIONS OF HYDROFLUOROOLEFINS AND HYDROCHLOROFLUOROOLEFINS

(71) Applicant: Arkema Inc., King of Prussia, PA (US)

(72) Inventor: Benjamin Bin Chen, Wayne, PA (US)

(73) Assignee: Arkema Inc., King of Prussia, PA (US)

( * ) Notice: Subject to any disclaimer, the term of this patent is extended or adjusted under 35 U.S.C. 154(b) by 0 days.

(21) Appl. No.: 16/869,621

(22) Filed: May 8, 2020

(65) Prior Publication Data
US 2020/0262995 A1 Aug. 20, 2020

Related U.S. Application Data

(60) Continuation-in-part of application No. 14/788,967, filed on Jul. 1, 2015, now abandoned, which is a division of application No. 14/243,048, filed on Apr. 2, 2014, now abandoned, which is a division of application No. 13/914,711, filed on Jun. 11, 2013, now Pat. No. 8,772,364, which is a continuation-in-part of application No. 12/532,238, filed as application No. PCT/US2008/058594 on Mar. 28, 2008, now abandoned.

(60) Provisional application No. 60/908,762, filed on Mar. 29, 2007.

(51) Int. Cl.
*C08J 9/14* (2006.01)
*C08J 9/12* (2006.01)

(52) U.S. Cl.
CPC ............... *C08J 9/144* (2013.01); *C08J 9/127* (2013.01); *C08J 9/142* (2013.01); *C08J 9/146* (2013.01); *C08J 9/149* (2013.01); *C08J 2203/12* (2013.01); *C08J 2203/162* (2013.01); *C08J 2203/182* (2013.01); *C08J 2203/202* (2013.01); *C08J 2325/06* (2013.01); *Y10T 428/249953* (2015.04)

(58) Field of Classification Search
CPC ... C08J 9/144; C08J 9/146; C08J 9/127; C08J 9/142; C08J 9/149; C08J 2325/06; C08J 2203/182; C08J 2203/12; C08J 2203/162; C08J 2203/202; Y10T 428/249953
See application file for complete search history.

(56) References Cited

U.S. PATENT DOCUMENTS

| | | | |
|---|---|---|---|
| 4,085,073 | A | 4/1978 | Suh et al. |
| 4,323,528 | A | 4/1982 | Collins |
| 6,300,378 | B1 | 10/2001 | Tapscott et al. |
| 2004/0119047 | A1 | 6/2004 | Singh et al. |

(Continued)

FOREIGN PATENT DOCUMENTS

| | | |
|---|---|---|
| CA | 2 016 328 | 11/1990 |
| GB | 950 876 | 2/1964 |

(Continued)

*Primary Examiner* — Kara B Boyle
(74) *Attorney, Agent, or Firm* — Steven D. Boyd

(57) ABSTRACT

The present invention relates to blowing agent compositions comprising at least one hydrofluoroolefin (HFO) selected from cis- and/or trans-1,3,3,3-tetrafluoropropene (HFO-1234ze) and at least one hydrochlorofluoroolefin (HCFO) selected from cis- and/or trans-1-chloro-3,3,3-trifluoropropene (HCFO-1233zd) used in the preparation of foamable thermoplastic compositions. The blowing agent compositions are useful in the production of low density insulating foams with improved k-factor.

10 Claims, 1 Drawing Sheet

(56) References Cited

U.S. PATENT DOCUMENTS

| | | | |
|---|---|---|---|
| 2004/0256594 A1* | 12/2004 | Singh | C09D 7/20 |
| | | | 252/71 |
| 2006/0142173 A1 | 6/2006 | Johnson et al. | |
| 2006/0243945 A1 | 11/2006 | Minor et al. | |
| 2007/0010592 A1* | 1/2007 | Bowman | C08J 9/146 |
| | | | 521/131 |
| 2010/0087555 A1 | 4/2010 | Vo et al. | |
| 2015/0165658 A1* | 6/2015 | Bowman | B29C 44/50 |
| | | | 264/54 |

FOREIGN PATENT DOCUMENTS

| | | |
|---|---|---|
| WO | WO 2004/037913 A2 | 5/2004 |
| WO | WO 2005/015947 A2 | 11/2005 |
| WO | WO 2006/069362 A2 | 6/2006 |
| WO | WO 2007/002625 A2 | 1/2007 |
| WO | WO 2007/002703 A2 | 1/2007 |

* cited by examiner

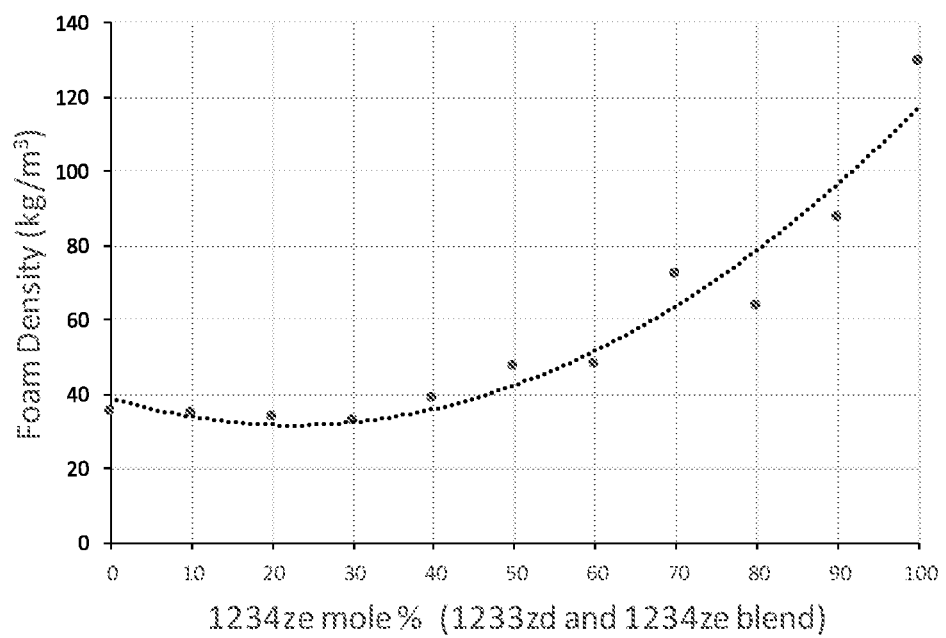

BLOWING AGENT COMPOSITIONS OF HYDROFLUOROOLEFINS AND HYDROCHLOROFLUOROOLEFINS

This application is a continuation-in-part of U.S. application Ser. No. 14/788,967 filed Jul. 1, 2015, which is a divisional of U.S. application Ser. No. 14/243,048 filed Apr. 2, 2014, which is a divisional of U.S. application Ser. No. 13/914,711 filed Jun. 11, 2013, which issued as U.S. Pat. No. 8,772,364 on Jul. 8, 2014, which is a continuation-in-part of U.S. application Ser. No. 12/532,238 filed Sep. 21, 2009, abandoned, which claimed priority to International application serial number PCT/US08/58594 filed Mar. 28, 2008 which application designated the United States and which claimed priority to U.S. provisional application Ser. No. 60/908,762 filed Mar. 29, 2007 all of which are incorporated herein by reference.

SUMMARY OF INVENTION

The present invention relates to blowing agent compositions comprising (1) at least one hydrofluoroolefin (HFO) selected from cis- and/or trans-1,3,3,3-tetrafluoropropene (HFO-1234ze), and (2) at least one hydrochlorofluoroolefin (HCFO) selected from cis- and/or trans 1-chloro-3,3,3-trifluoropropene (HCFO-1233zd), used in the preparation of foamable thermoplastic compositions. The blowing agent compositions are useful in the production of low density insulating foams with improved k-factor.

BACKGROUND OF INVENTION

With the continued concern over global climate change there is an increasing need to develop technologies to replace those with high ozone depletion potential (ODP) and high global warming potential (GWP). Though hydrofluorocarbons (HFC), being non-ozone depleting compounds, have been identified as alternative blowing agents to chlorofluorocarbons (CFCs) and hydrochlorofluorocarbons (HCFCs) in the production of thermoplastic foams, they still tend to have significant GWP.

Hydrofloroolefins, such as HFO-1243zf, (cis/trans)-HFO-1234ze, HFO-1234yf, and (E/Z)-HFO-1225ye, have been identified as potential low GWP blowing agents for the production of thermoplastic foams, including extruded polystyrene foams for thermal insulation.

It was discovered that blowing agent compositions comprising at least one hydrofluorolefin selected from cis- and/or trans-1,3,3,3-tetrafluoropropene (HFO-1234ze) with at least one hydrochlorofluoroolefin selected from cis- and/or or trans 1-chloro-3,3,3-trifluoropropene (HCFO-1233zd) can permit the production of lower density, closed-cell foam with good k-factor which will be particularly useful for thermal insulating foams. This invention may also permit the production of low density, closed-cell foams with enlarged, controlled cell size.

WO 2004/037913, WO 2007/002703, and US Pat. Publication 2004119047 disclose blowing agents comprising halogenated alkenes of generic formula that would include numerous HFOs and HCFOs, among many other materials including brominated and iodinated compounds. The specific combination of HFOs with HCFOs in blowing agent compositions is not disclosed. Specific examples are shown for blowing agent compositions for foaming polystyrene comprising HFOs, specifically HFO-1234ze and HFO-1234yf, either alone or in combination with an HFC, and blowing agent compositions for PUR foaming comprising HCFO-1233zd. No examples of blowing agents combinations comprising HFOs and HCFOs are disclosed.

GB 950,876 discloses a process for the production of polyurethane foams. It discloses that any suitable halogenated saturated or unsaturated hydrocarbon having a boiling point below 150° C., preferably below 50° C., can be used as the blowing agent. Trichlorofluoroethene, chlorotrifluoroethene, and 1,1-dichloro-2,2-difluoroethene are disclosed in a list of suitable blowing agents along with 3,3,3-trifluoropropene. Hydrochlorofluoropropenes are not specifically disclosed nor are longer chain HCFOs nor other HFOs besides 3,3,3-trifluoropropene. There is no disclosure related to blowing agents for thermoplastic foaming, nor are the benefits of HCFOs in thermoplastic foaming mentioned, nor are the benefits of blowing agent combinations comprising HCFOs and HFOs.

CA 2016328 discloses a process for preparing closed-cell, polyisocyanate foam. Disclosed are organic compound blowing agents including halogenated alkanes and alkenes, where the alkene is propylene, and the halogenated hydrocarbons can be chlorofluorocarbons. Among the many exemplary compounds listed are specific chlorofluoroethylenes containing 1 chlorine and from 1 to 3 fluorines along with specific pentafluoropropene, tetrafluoropropene, and difluoropropene. Hydrochlorofluoropropenes are not specifically disclosed nor are longer chain HCFOs. There is no disclosure related to blowing agents for thermoplastic foaming, nor are the benefits of HCFOs in thermoplastic foaming mentioned, nor are the benefits of blowing agent combinations comprising HCFOs and HFOs.

BRIEF DESCRIPTION OF THE DRAWINGS

FIG. 1 is a graph of total blowing agent content versus foam density for examples 15-26.

DETAILED DESCRIPTION OF INVENTION

The present invention relates to the use of blowing agents with negligible ozone-depletion and low GWP comprising (1) at least one hydrofluoroolefin (HFO) selected from cis- and/or trans-1,3,3,3-tetrafluoropropene (HFO-1234ze) and (2) at least on hydrochlorofluoroolefin (HCFO) selected from cis- and/or trans-1-chloro-3,3,3-trifluoropropene (HCFO-1233zd). The present invention discloses blowing agent and foamable resin compositions useful for the production of thermoplastic foams, which may be polystyrene, polyethylene, polypropylene, or mixtures thereof, with decreased density and improved k-factor that can be used as insulating foams.

The blowing agent composition of the present invention may further comprise co-blowing agents such as hydrofluorocarbons, alkanes, carbon dioxide, methyl formate, inert gases, atmospheric gases, alcohols, ethers, fluorinated ethers, unsaturated fluorinated ethers, ketones, fluoroketones, water, and mixtures thereof. The hydrofluorocarbons may be selected from HFC-32, HFC-161, HFC-152, HFC-152a, HFC-143, HFC-143a, HFC-134, HFC-134a, HFC-125, HFC-245fa, HFC-365mfc, HFC-227ea, or mixtures thereof. The alkanes may be selected from propane, butane, pentane, such as n-pentane, cyclopentane, iso-pentane or mixtures thereof, or hexane. The alcohols may be selected from ethanol, iso-propanol, butanol, ethyl hexanol, methanol, or mixtures thereof. The ethers may be selected from dimethyl ether, diethyl ether, methyl ethyl ether, or mixtures thereof. The ketones may be selected from acetone, methyl ethyl ketone, or mixtures thereof. In addition, the blowing agent composition of the present invention may further comprise additives such as dyes, pigments, cell-controlling agents, fillers, antioxidants, extrusion aids, stabilizing agents, antistatic agents, fire retardants, IR attenuating agents, thermally insulating additives, plasticizers, viscosity modifiers, impact modifiers, gas barrier resins, carbon black, surfactants, and mixtures thereof.

Another embodiment of this invention are foamable resin compositions containing greater than about 1 parts per hundred (pph) and less than about 100 pph of the blowing agent composition with respect to resin, preferably greater than about 2 pph and less than about 40 pph, more preferably greater than about 3 pph and less than about 25 pph, and even more preferably greater than about 4 pph and less than about 15 pph of the blowing agent composition with respect to resin.

Another embodiment of this invention is a thermoplastic foam comprising a blowing agent with negligible ozone-depletion and low GWP comprising at least one hydrofluoroolefin (HFO) selected from cis- and/or trans-1,3,3,3-tetrafluoropropene (HFO-1234ze) and at least one hydrochlorofluoroolefin (HCFO)) selected from cis- and/or trans-1-chloro-3,3,3-trifluoropropene (HCFO-1233zd). The thermoplastic foams of the present invention exhibit a decreased density and improved k-factor and can be used as insulating foams. In one embodiment of the present invention, the thermoplastic foam has a density below about 50 kg/m$^3$ at a blowing agent loading of from about 7 to about 13 wt %, and preferably a density of between about 38 and 50 kg/m$^3$ at a blowing agent loading of from about 7 to about 13 wt %. In another embodiment of this invention, the thermoplastic foam has a density of less than about 70 kg/m$^3$, preferably from about 20 kg/m$^3$ to about 50 kg/m$^3$ and most preferably from about 38 kg/m$^3$ to about 50 kg/m$^3$. In another embodiment of this invention, the thermoplastic foam is a closed-cell foam, preferably with an open-cell content of less than about 20%, more preferably less than about 10%. In another embodiment of this invention, the thermoplastic foam has a fine cell structure, preferably with an average cell size of from about 0.05 mm to about 1.0 mm, more preferably from about 0.05 mm to about 0.5 mm.

In another embodiment of this invention, the blowing agent comprises from about 1 to about 99 wt % of the HCFO selected from cis- and/or trans-1,3,3,3-tetrafluoropropene (HFO-1234ze), preferably from about 2 to about 90 wt % of the HCFO) selected from cis- and/or trans-1-chloro-3,3,3-trifluoropropene (HCFO-1233zd). In embodiment of this invention, the blowing agent comprises more than about 10 wt % of the HCFO component. In embodiment of this invention, the blowing agent comprises more than about 20 wt % of the HCFO component. In embodiment of this invention, the blowing agent comprises more than about 30 wt % of the HCFO component. In embodiment of this invention, the blowing agent comprises less than about 70 wt % of the HCFO component. In embodiment of this invention, the blowing agent comprises less than about 65 wt % of the HCFO component. In embodiment of this invention, the blowing agent comprises less than about 60 wt % of the HCFO component. In embodiment of this invention, the blowing agent comprises less than about 50 wt % of the HCFO component. In another embodiment of the this invention, the blowing agent comprises more than about 20 wt % of the HFO component. In another embodiment of this invention, the blowing agent comprises more than about 30 wt % of the HFO component. In another embodiment of this invention, the blowing agent comprises more than about 40 wt % of the HFO component. In another embodiment of this invention, the blowing agent comprises more than about 50 wt % of the HFO component. In another embodiment of this invention, the blowing agent comprises more than about 60 wt % of the HFO component. In another embodiment of this invention, the blowing agent comprises more than about 70 wt % of the HFO component. In another embodiment of this invention, the blowing agent comprises more than about 90 wt % of the HFO component. In another embodiment of this invention, the blowing agent comprises from about 50 wt % to about 98 wt % of the HFO component.

In another embodiment of this invention, the blowing agent comprises from about 5 to about 35 mole % of the HCFO selected from cis- and/or trans-1,3,3,3-tetrafluoropropene (HFO-1234ze) and from about 95 to about 65 mole % of the HCFO selected from cis- and/or trans-1-chloro-3,3,3-trifluoropropene (HCFO-1233zd).

The process for preparing a foamed thermoplastic product, which may be polystyrene, polyethylene, polypropylene, or mixtures thereof, is as follows: Prepare a foamable polymer composition by blending together components comprising foamable polymer composition in any order. Typically, prepare a foamable polymer composition by plasticizing a polymer resin and then blending in components of a blowing agent composition at an initial pressure. A common process of plasticizing a polymer resin is heat plasticization, which involves heating a polymer resin enough to soften it sufficiently to blend in a blowing agent composition. Generally, heat plasticization involves heating a thermoplastic polymer resin near or above its glass transition temperature (Tg), or melt temperature (Tm) for crystalline polymers.

A foamable polymer composition can contain additional additives such as nucleating agents, cell-controlling agents, dyes, pigments, fillers, antioxidants, extrusion aids, stabilizing agents, antistatic agents, fire retardants, IR attenuating agents and thermally insulating additives. Nucleating agents include, among others, materials such as talc, calcium carbonate, sodium benzoate, and chemical blowing agents such azodicarbonamide or sodium bicarbonate and citric acid. IR attenuating agents and thermally insulating additives can include carbon black, graphite, silicon dioxide, metal flake or powder, among others. Flame retardants can include, among others, brominated materials such as hexabromocyclodecane and polybrominated biphenyl ether.

Foam preparation processes of the present invention include batch, semi-batch, and continuous processes. Batch processes involve preparation of at least one portion of the foamable polymer composition in a storable state and then using that portion of foamable polymer composition at some future point in time to prepare a foam.

A semi-batch process involves preparing at least a portion of a foamable polymer composition and intermittently expanding that foamable polymer composition into a foam all in a single process. For example, U.S. Pat. No. 4,323,528, herein incorporated by reference, discloses a process for making polyolefin foams via an accumulating extrusion process. The process comprises: 1) mixing a thermoplastic material and a blowing agent composition to form a foamable polymer composition; 2) extruding the foamable polymer composition into a holding zone maintained at a temperature and pressure which does not allow the foamable polymer composition to foam; the holding zone has a die defining an orifice opening into a zone of lower pressure at which the foamable polymer composition foams and an openable gate closing the die orifice; 3) periodically opening the gate while substantially concurrently applying mechanical pressure by means of a movable ram on the foamable polymer composition to eject it from the holding zone through the die orifice into the zone of lower pressure, and 4) allowing the ejected foamable polymer composition to expand to form the foam.

A continuous process involves forming a foamable polymer composition and then expanding that foamable polymer composition in a non-stop manner For example, prepare a foamable polymer composition in an extruder by heating a polymer resin to form a molten resin, blending into the molten resin a blowing agent composition at an initial pressure to form a foamable polymer composition, and then extruding that foamable polymer composition through a die into a zone at a foaming pressure and allowing the foamable polymer composition to expand into a foam. Desirably, cool the foamable polymer composition after addition of the blowing agent and prior to extruding through the die in order to optimize foam properties. Cool the foamable polymer composition, for example, with heat exchangers.

Foams of the present invention can be of any form imaginable including sheet, plank, rod, tube, beads, or any combination thereof. Included in the present invention are laminate foams that comprise multiple distinguishable longitudinal foam members that are bound to one another.

EXAMPLES

Examples 1-8: Solubility and Diffusivity of Gases in Polystyrene

The solubility and diffusivity of gases in polystyrene resin was measured using capillary column inverse gas chromatography (cc-IGC) as described in: Hadj Romdhane, Ilyess (1994) "Polymer-Solvent Diffusion and Equilibrium Parameters by Inverse Gas-Liquid Chromatography" PhD Dissertation, Dept. of Chem. Eng., Penn State University and Hong S U, Albouy A, Duda J L (1999) "Measurement and Prediction of Blowing Agent Solubility in Polystyrene at Supercritical Conditions" Cell Polym 18(5):301-313.

A 15 m long, 0.53 mm diameter GC capillary-column was prepared with a 3 micron thick polystyrene internal film coating. The column was installed into a Hewlet Packard 5890 Series II Gas Chromatograph with flame ionizer detector. Elution profiles for gases being tested were analyzed according the method outlined in the reference, using methane as the reference gas. The results give the diffusion coefficient of the gas through the polymer, Dp, and the solubility of the gas in the polymer in terms of the partition coefficient, K, which is the ratio of the concentration of the gas in the polymer phase to the concentration in the vapor phase. As such, the greater the value of K for a particular gas in the resin the greater its solubility in that resin.

Table 1 shows the partition coefficient and diffusivity values for several gases in polystyrene at 140° C. Comparative examples 1 and 2 show the solubility and diffusivity of two well studied blowing agents in polystyrene: HCFC-142b (1-chloro-1,1-difluoroethane) and HFC-134a (1,1,1,2-tetrafluoroethane). Examples 3-6 show the solubility and diffusivity of selected HFOs in polystyrene: HFO-1243zf (3,3,3-trifluoropropene), HFO-1234ze (1,3,3,3-tetrafluoropropene), HFO-1234yf (2,3,3,3-tetrafluoropropene), HFO-1225ye (1,2,3,3,3-pentafluoropropene). Examples 7 and 8 show the solubility and diffusivity of trans-HCFO-1233zd (1-chloro-3,3,3-trifluoropropene) and HCFO-1233xf (2-chloro-3,3,3-trifluoropropene).

The good solubility and favorable diffusivity of the HCFOs in polystyrene indicate that they should be effective coblowing agents and/or processing aids for the production of thermoplastic foams using HFO blowing agents. The solubility of the HCFOs in polystyrene is sufficient to provide useful plasticization of the thermoplastic resin to assist in foaming As can be seen, HCFO-1233xf has a solubility in polystyrene comparable to that of HCFC-142b.

TABLE 1

Partition Coefficient and Diffusivity of Gases in Polystyrene at 140° C. by Inverse Gas Chromatography

| Example | Gas | Bp (° C.) | MW (g/mol) | K | Dp (cm$^2$/s) |
|---|---|---|---|---|---|
| 1 | HCFC-142b | −9.8 | 100.49 | 1.249 | 2.61E−08 |
| 2 | HFC-134a | −26.1 | 102.02 | 0.397 | 3.40E−08 |
| 3 | HFO-1243zf | −22 | 96.05 | 0.544 | 2.95E−08 |
| 4 | HFO-1234ze | −16 | 114.04 | 0.423 | 3.09E−08 |
| 5 | HFO-1225ye | −18 | 132.03 | 0.312 | 2.44E−08 |
| 6 | HFO-1234yf | −28.5 | 114.04 | 0.275 | >2E−08 |
| 7 | HCFO-1233zd | 20.5 | 130.5 | 2.326 | 1.72E−08 |
| 8 | HCFO-1233xf | 15 | 130.5 | 1.475 | 1.67E−08 |

Example 9 to 19—Polystyrene Foaming Batch trans-2,3,3,3-tetrafluoropropene (1234ze) and trans-1-chloro-3,3,3-trifluoropropene (1233zd)

Batch-wise foaming experiments were conducted in 300 mL stainless steel autoclaves. For each example, approximately 6 gm of polystyrene powder was loaded into the autoclave. The autoclave was sealed and then evacuated to vacuum. The blowing agent was then charged to the autoclave; if multiple blowing agents were used, each was charged separately. The total molar amount of the blowing agent remained the same in the different tests. The autoclave was then heated to achieve the desired temperature in the autoclave, 115±0.5° C., and elevated pressure and then maintained at that temperature for about 24 hours. To initiate foaming after the 24 hour wait period, the autoclave was rapidly degassed by opening a vent port. The autoclave was then opened and the foam sample removed and analyzed. Foam densities were determined for each foam sample.

Example 9: the blowing agent was 100 mole % trans-1-chloro-3,3,3-trifluoropropene (1233zd).

Example 10: the blowing agent was 90 mole % trans-2,3,3,3-tetrafluoropropene (1234ze) and 10 mole % trans-1-chloro-3,3,3-trifluoropropene (1233zd).

Example 11: the blowing agent was 80 mole % trans-2,3,3,3-tetrafluoropropene (1234ze) and 20 mole % trans-1-chloro-3,3,3-trifluoropropene (1233zd).

Example 12: the blowing agent was 70 mole % trans-2,3,3,3-tetrafluoropropene (1234ze) and 30 mole % trans-1-chloro-3,3,3-trifluoropropene (1233zd).

Example 13: the blowing agent was 60 mole % trans-2,3,3,3-tetrafluoropropene (1234ze) and 40 mole % trans-1-chloro-3,3,3-trifluoropropene (1233zd).

Example 14: the blowing agent was 50 mole % trans-2,3,3,3-tetrafluoropropene (1234ze) and 50 mole % trans-1-chloro-3,3,3-trifluoropropene (1233zd).

Example 15: the blowing agent was 40 mole % trans-2,3,3,3-tetrafluoropropene (1234ze) and 60 mole % trans-1-chloro-3,3,3-trifluoropropene (1233zd).

Example 16: the blowing agent was 30 mole % trans-2,3,3,3-tetrafluoropropene (1234ze) and 70 mole % trans-1-chloro-3,3,3-trifluoropropene (1233zd).

Example 17: the blowing agent was 20 mole % trans-2,3,3,3-tetrafluoropropene (1234ze) and 80 mole % trans-1-chloro-3,3,3-trifluoropropene (1233zd).

Example 18: the blowing agent was 10 mole % trans-2,3,3,3-tetrafluoropropene (1234ze) and 90 mole % trans-1-chloro-3,3,3-trifluoropropene (1233zd).

Example 19: the blowing agent was 100 mole % trans-2,3,3,3-tetrafluoropropene (1234ze).

The resulting foam densities are summarized in Table 2. The total molar amount of blowing agent was 0.24 moles for all tests.

TABLE 2

| Example | Mole % 1234ze | Mole % 1233zd | Density of foam (kg/m$^3$) |
|---|---|---|---|
| 9 | 0 | 100 | 35.1 ± 2.2 |
| 10 | 10 | 90 | 34.9 ± 2.2 |
| 11 | 20 | 80 | 33.6 ± 2.0 |
| 12 | 30 | 70 | 32.5 ± 1.8 |
| 13 | 40 | 60 | 39 ± 1.9 |
| 14 | 50 | 50 | 47.4 ± 2.2 |
| 15 | 60 | 40 | 47.8 ± 2.1 |
| 16 | 70 | 30 | 72.4 ± 5.0 |
| 17 | 80 | 20 | 63.8 ± 2.3 |
| 18 | 90 | 10 | 87.5 ± 2.4 |
| 19 | 100 | 0 | 129.4 ± 2.3 |

The results shown in Table 2 are plotted as in FIG. 1. It shows that when the molar ratio of HFO-1234ze to HCFO-1233zd ranged from about 5:95 to about 35:65, the density of the foam drops below that of foam produced with 100 mole % HCFO-1233zd.

Although the invention is illustrated and described herein with reference to specific embodiments, it is not intended that the appended claims be limited to the details shown. Rather, it is expected that various modifications may be made in these details by those skilled in the art, which modifications may still be within the spirit and scope of the claimed subject matter and it is intended that these claims be construed accordingly.

The invention claimed is:

1. A polystyrene foam product comprising a blowing agent composition comprising a combination of the hydrofluoroolefin trans-1,3,3,3-tetrafluoropropene and the hydrochlorofluoroolefin trans-1-chloro-3,3,3-trifluoropropene wherein the molar percent of trans-1,3,3,3-tetrafluoropropene ranges from about 10 to about 30 and the molar percent of trans-1-chloro-3,3,3-trifluoropropene ranges from from about 70 to about 90 and wherein said foam product, formed at a temperature of about 115° C., has a density less than the density produced by 100 mole % trans-1-chloro-3,3,3-trifluoropropene.

2. The polystyrene foam product of claim 1 wherein said blowing agent composition further comprises a coblowing agent selected from the group consisting of hydrofluorocarbons, alkanes, carbon dioxide, methyl formate, inert gases, atmospheric gases, alcohols, ethers, fluorinated ethers, unsaturated fluorinated ethers, ketones, fluoroketones, water, and mixtures thereof.

3. The polystyrene foam product of claim 2 wherein said hydrofluorocarbon is selected from HFC-32, HFC-161, HFC-152, HFC-152a, HFC-143, HFC-143a, HFC-134, HFC-134a, HFC-125, HFC-245fa, HFC-365mfc, HFC-227ea, or mixtures thereof.

4. The polystyrene foam product of claim 2 wherein said hydrofluorocarbon is selected from HFC-134a, HFC-152a, HFC-32, HFC-143a, HFC-245fa, or mixtures thereof.

5. The polystyrene foam product of claim 2 wherein said alkane is selected from propane, butane, pentane, or hexane.

6. The polystyrene foam product of claim 5 wherein said pentane is selected from n-pentane, cyclopentane, iso-pentane or mixtures thereof.

7. The polystyrene foam product of claim 2 wherein said alcohol is selected from ethanol, iso-propanol, butanol, ethyl hexanol, methanol, or mixtures thereof.

8. The polystyrene foam product of claim 2 wherein said ether is selected from dimethyl ether, diethyl ether, methyl ethyl ether, or mixtures thereof.

9. The polystyrene foam product of claim 2 wherein said ketone is selected from acetone, methyl ethyl ketone, or mixtures thereof.

10. The polystyrene foam product of claim 2 further comprising an additive selected from the group consisting of carbon black, graphite, silicon dioxide, metal flake, metal powder and mixtures thereof.

* * * * *